United States Patent
Freeman

[15] 3,666,887
[45] May 30, 1972

[54] HEAD-UP DISPLAYS

[72] Inventor: Michael H. Freeman, Denbigh Court, England

[73] Assignee: Pilkington Perkin-Elmer Limited, Liverpool, England

[22] Filed: June 24, 1969

[21] Appl. No.: 836,048

[30] Foreign Application Priority Data

June 29, 1968 Great Britain..................31,225/68

[52] U.S. Cl. .......................178/7.85, 178/DIG. 20
[51] Int. Cl. ..........................................H04n 7/02
[58] Field of Search.........................178/6 ND, 7.85

[56] References Cited

UNITED STATES PATENTS

| | | | |
|---|---|---|---|
| 3,205,303 | 9/1965 | Bradley.................. | 178/6 |
| 3,291,906 | 12/1966 | Ward et al. ............ | 178/7.85 |

*Primary Examiner*—Robert L. Griffin
*Assistant Examiner*—Barry Leibowitz
*Attorney*—Mattern, Ware and Davis

[57] ABSTRACT

This invention relates to the provision of a head-up display system for use in vehicles such as aircraft or land vehicles. A head-up display system superimposes selected visual information on the field of view so that an observer can see not only the view but also the visual information without having to look down at a dial or the like. In the present system there is provided a source of light information signals and means for superimposing an image of the said signals on the field of view of the observer together with means for detecting any angular displacement of the superimposed image with respect to a predetermined position and for producing a control signal proportional to the displacement. Finally there is provided a means responsive to the control signal to adjust the orientation of the light information signals so that the position of the signals in the image viewed by the observer remains more or less constant.

6 Claims, 1 Drawing Figure

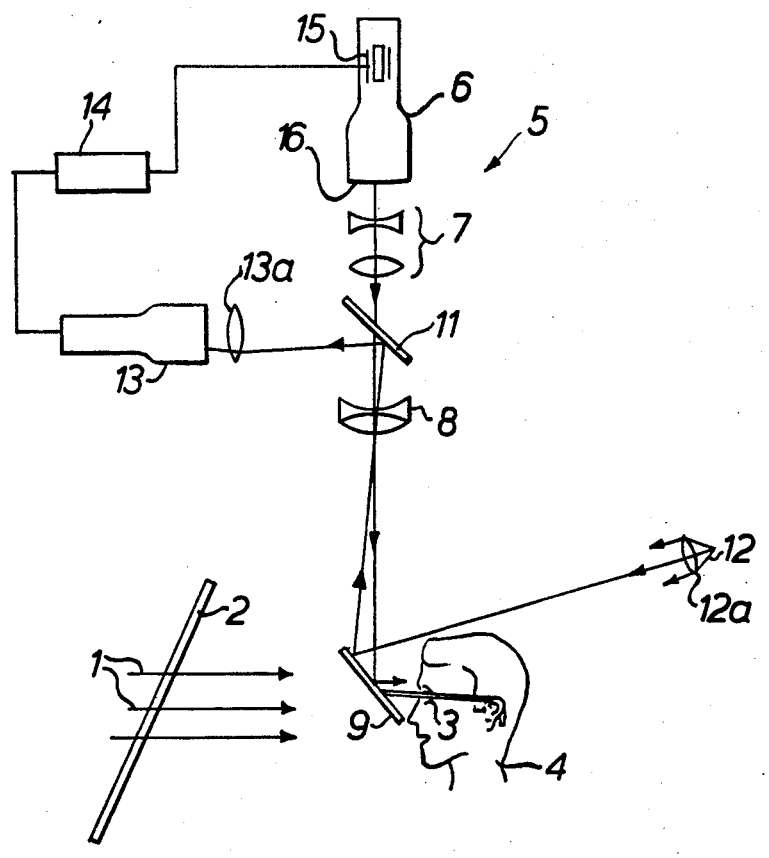

HEAD-UP DISPLAYS

BACKGROUND OF THE INVENTION

As stated above a head-up display system serves to superimpose visual information on the field of view of an observer in a vehicle, for example, a pilot in an aircraft, so that the observer can simultaneously view the outside scene and see the visual information without having to change his direction of view, in particular without having to lower his head. In modern aircraft there are severe restrictions on the space and position which can be occupied by head-up display equipment. Notably the equipment cannot be mounted on the aircraft too near the pilot's head and, if it is suggested that the complete head-up display equipment should be mounted actually on the pilot's head, problems are encountered in relating the pilot's head position to the orientation of the aircraft.

It is an object of the present invention to provide a head-up display system which is particularly, but not exclusively, suitable for use in modern aircraft.

SUMMARY OF THE INVENTION

According to the present invention there is provided a head-up display system for displaying information to an observer having a predetermined field of view, comprising a source of light information signals, means for superimposing an image of said signals on the field of view of the observer by directing light carrying the signals to the observer, means for detecting angular displacement of the superimposing means with respect to a predetermined axis and for producing a control signal indicative of such angular displacement, and means responsive to such control signal for adjusting the orientation of the light information signals so that the orientation of the signals in the image viewed by the observer remains substantially constant with respect to said predetermined axis.

Preferably the system comprises means to collimate the light carrying the information signals so that the image seen by the observer appears at infinity.

There may be provided means for supporting the superimposing means in substantially fixed relationship to the head of the observer; for example, the superimposing means may be carried on supporting means adapted to be worn by the observer in the manner of spectacles or goggles. By this arrangement changes in orientation of the observer's head will produce corresponding changes in orientation of the superimposing means, such latter changes in orientation being monitored and the necessary correction fed in the form of a control signal into the head-up display system to adjust the orientation of the light information signals. Conveniently the superimposing means comprise a partial reflector plate.

The means for detecting angular displacement of the superimposing means and for producing a control signal indicative thereof may comprise means to direct a beam of light, for example, infra-red light, on to the superimposing means, means to receive light reflected from said beam by the superimposing means, and means to emit a control signal responsively to displacement of the reflected light. With this arrangement angular displacement of the superimposing means causes corresponding angular displacement of light reflected from said beam, and the latter displacement can be utilized to effect production of a control signal.

The source of light information signals may comprise a cathode ray tube, and a control signal may be applied to beam deflection means in the cathode ray tube to adjust the orientation of the light information signals emitted thereby.

Apparatus in accordance with the invention will now be described, by way of example, with reference to the accompanying drawing, which schematically illustrates a head-up display system in an aircraft.

The drawing shows the windscreen 2 of the aircraft through which light 1 is transmitted from the outside scene towards the eyes 3 of the pilot 4. The pilot has a predetermined field of view of the outside scene through the windscreen 2 and he generally looks forwardly, i.e. to the left as viewed in the drawing.

The head-up display system comprises a projection system, generally indicated as 5, mounted on the aircraft. The system includes a cathode ray tube 6 which produces light information signals, and a field lens 7 and a collimating lens 8 arranged to project a light beam carrying said signals downwardly.

The light beam is directed onto a partial reflector plate 9 and is reflected therefrom to the eyes 3 of the pilot 4. Since the light beam incident on the plate 9 is collimated the pilot sees an image of the information signals which appears at infinity, the image being superimposed on his field of view through the windscreen 2, and light 1 from the outside scene being transmitted through the partial reflector plate 9 to his eyes.

The plate 9 is carried on a support frame 10 which can be mounted on the pilot's head in the manner of spectacles or goggles. Preferably the mounting of the plate 9 is such that it can pivot about an axis parallel to the line joining the pilot's eyes so that the orientation of the plate can be adjusted. Normally, i.e. when the pilot is in his normal directly forward looking position, the plate 9 will be disposed at an angle of 45° to the horizontal. If desired the mounting of the plate 9 may be such as additionally to permit angular adjustment about an axis perpendicular to the line joining the pilot's eyes.

A mirror 11 which is transparent to visible light but of high reflectivity to infra-red light is interposed between the lenses 7 and 8. Infra-red light is emitted from a point source 12, which is fixed relative to the aircraft, so that a beam of infra-red light is incident on the plate 9, a suitable lens 12a being provided to project a narrow collimated beam of light from the point source 12. This beam is reflected from the plate through the lens 8 on to the mirror 11 and therefrom on to a vidicon tube 13 having an associated lens 13a. It will be appreciated that a change in orientation of the plate 9, i.e. angular displacement of this plate with respect to a predetermined axis, and notably with respect to the optical axis of the pilot's field of view, will produce corresponding angular displacement of the infra-red light reflected from the plate 9 to the mirror 11, and hence a displacement of the infra-red light incident on the vidicon tube 13. The vidicon tube 13 thus produces an output signal indicative of the angular displacement of the plate 9. This signal is applied to a control unit 14 which responsively applies electrical signals to the beam deflection plate 15 of the cathode ray tube 6 in such manner that the orientation of the light information signals emitted by the cathode ray tube 6 is adjusted in a manner related to the detected angular displacement of the plate 9. Thus changes in the orientation of the mirror 9 are compensated by movements of the pattern or trace on the screen 16 of the cathode ray tube, and the image of the information signals seen by the pilot through reflection from the partial reflector plate 9 can therefore be maintained at a substantially constant orientation with respect to the aircraft despite changes in orientation of the plate 9.

It will be appreciated that the head-up display system described above as fitted in an aircraft can readily be applied to other forms of vehicle such as land vehicles.

We claim:

1. A head-up display system for displaying information to an observer in a vehicle having a predetermined field of view from the vehicle comprising a source of light information signals mounted on the vehicle, means mounted on the observer for superimposing an image of said signals on the field of view of the observer by directing light carrying the signals to the observer, monitoring means mounted on the vehicle for detecting angular displacement of the superimposing means with respect to a predetermined axis and for producing a control signal indicative of such angular displacement, and means responsive to such control signal for adjusting the orientation of the light information signals so that the orientation of the signals in the image viewed by the observer remains substantially constant with respect to said predetermined axis, wherein the monitoring means for detecting angular displacement of the superimposing means for producing a control signal indicative thereof comprise means to direct a beam of radiation onto the superimposing means, means to receive radiation reflected from said beam by the superimposing means, and means to emit a control signal responsively to displacement of the reflected radiation.

2. A system as claimed in claim 1 wherein said beam of radiation is infra-red radiation.

3. A system as claimed in claim 1 comprising projection means mounted on the vehicle and adapted to project light from said source of light information signals towards said superimposing means, and wherein radiation from said beam of radiation reflected by the superimposing means travels through at least part of said projection means.

4. A system as claim in claim 1 wherein said beam of radiation is distinguishable from light emitted by said source of light information signals, and further comprising an optical element disposed in the light path between said source of light information signals and said superimposing means and adapted to act selectively on said light and said radiation so that light from said source of light information signals travels via said optical element to said superimposing means, and said radiation reflected by said superimposing means and received by said optical element travels therefrom along a path different from that between said element and said source of light information signals.

5. A system as claimed in claim 4 wherein said optical element is adapted to transmit light from said source of light information signals and to reflect radiation from said beam of radiation.

6. A head-up display apparatus for displaying information to an aircraft pilot superimposed on his line of sight forward of the aircraft, the apparatus comprising a cathode ray tube mounted on the aircraft and adapted to emit light information signals, a partial reflector plate adapted to be worn by the pilot so that he can look therethrough along his line of sight, a field lens and a collimating lens mounted on the aircraft and adapted to collimate the light information signals from the cathode ray tube and project them onto said plate when worn by the pilot so that the plate reflects the light towards the pilot's eyes, who thereby sees an image of light information signals superimposed on his line of sight and appearing at infinity, a source of radiation mounted on the aircraft, a lens to project a beam of radiation from said source towards said plate when worn by the pilot, a vidicon tube to receive radiation from said beam reflected by said plate and adapted to emit an output signal indicative of the position of the received radiation, a control unit to receive said output signal and to apply a control signal to a beam deflection plate of said cathode ray tube responsively to a displacement of the radiation received by said vidicon tube, thereby to adjust the orientation of the light information signals emitted by the cathode ray tube to compensate for a change in orientation of said partial reflector plate worn by the pilot.

* * * * *

UNITED STATES PATENT OFFICE
CERTIFICATE OF CORRECTION

Patent No. 3,666,887      Dated      May 30, 1972

Inventor(s)      Michael H. Freeman

It is certified that error appears in the above-identified patent and that said Letters Patent are hereby corrected as shown below:

Change the filing date from "June 24, 1979" to -- June 24, 1969 --

Column 2, line 74, after "means" insert -- and --

Signed and sealed this 24th day of October 1972.

(SEAL)
Attest:

EDWARD M. FLETCHER, JR.
Attesting Officer

ROBERT GOTTSCHALK
Commissioner of Patents